Feb. 14, 1956 W. SCHAELCHLIN 2,735,054
PROTECTIVE SYSTEM FOR DYNAMOELECTRIC MACHINES
Filed Jan. 18, 1954 2 Sheets-Sheet 2

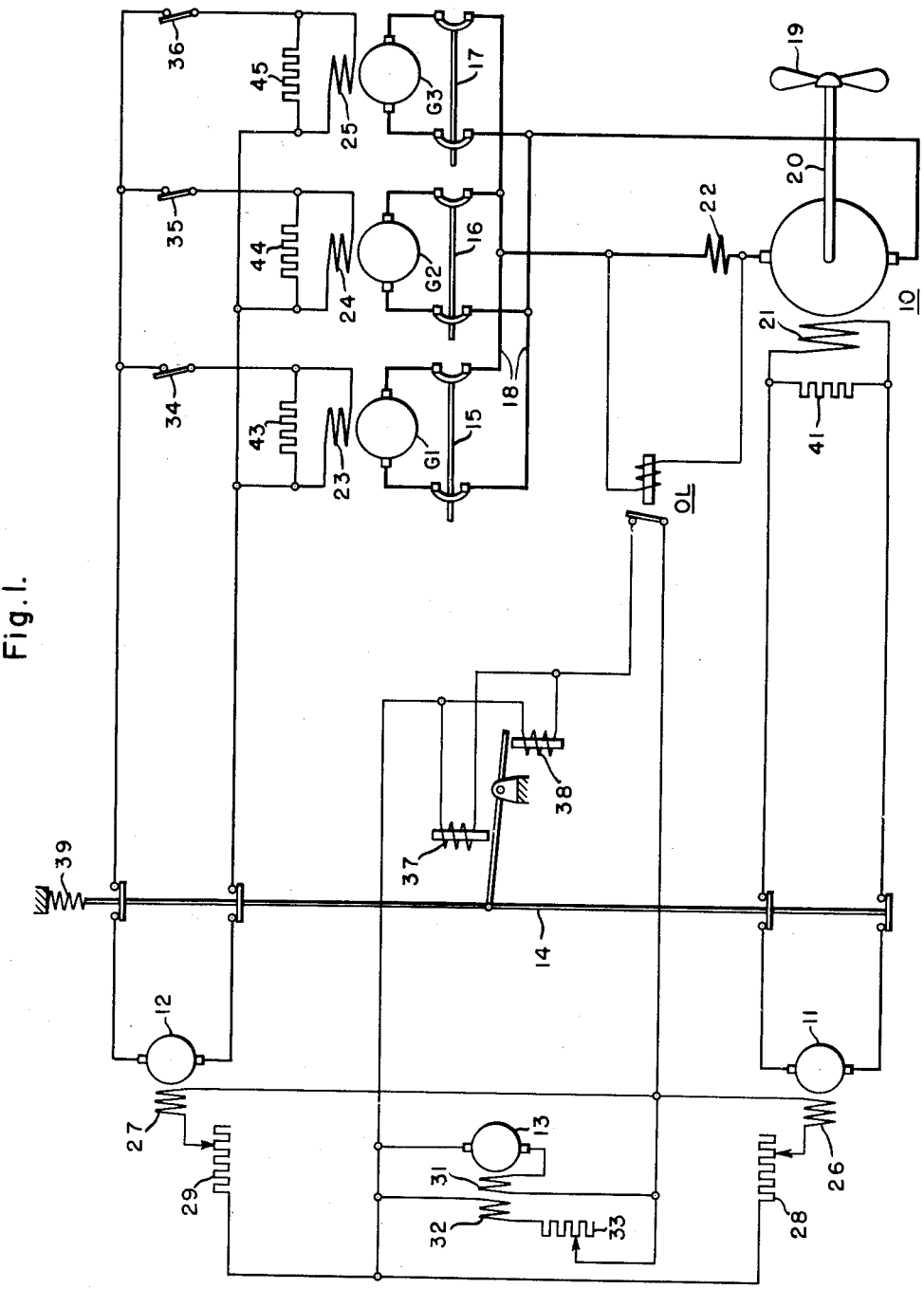
Fig. I.

WITNESSES
Ww. C. Groome
James H. Young

INVENTOR
Walter Schaelchlin
BY
ATTORNEY

United States Patent Office 2,735,054
Patented Feb. 14, 1956

2,735,054

PROTECTIVE SYSTEM FOR DYNAMOELECTRIC MACHINES

Walter Schaelchlin, Buffalo, N. Y., assignor to Westinghouse Electric Corporation, East Pittsburgh, Pa., a corporation of Pennsylvania Application January 18, 1954, Serial No. 404,551

10 Claims. (Cl. 318—144)

My invention relates, generally, to protective systems, and, more particularly, to systems for protecting the dynamoelectric machines of adjustable voltage drives against overloads and other fault conditions.

Electric drives of the constant voltage type are usually protected against overloads by providing contactors, or circuit breakers, which disconnect the motor from the power supply. However, this is not the case with electric drives of the adjustable voltage type which have their own power supply. In such a drive, the generator field can be used to control the power to the motor, thereby making it unnecessary to open the armature circuit in order to stop it.

In other words, it is possible to operate with a closed loop system which, because of its smoothness of control, has many operating advantages. There have been many drives having one main generator and one main motor, such as propulsion drives, hoists, power shovels and diesel-electric locomotives, in which all protection against operational overloads and actual faults is obtained by means of suitable field control.

Operational or normal overloads are generally caused by the extra torque required to accelerate and decelerate the drive. They are kept within permissible limits by so controlling the rate of generator voltage change by means of relays or regulating systems that the motor speed can follow without necessitating an excessive torque. The various schemes of field control utilized in the past have been satisfactory for the purpose of current limit during normal operation.

The opening of the field circuit while the armature circuit remains closed under extreme overload, or fault condition, is a more difficult problem because of the close linkage between the main field and part of the armature winding. Above about 250% load current, the interpoles begin to saturate and are unable to compensate for the reactance voltage of the commutated coil, thereby causing a circulating current to flow which produces differential ampere turns directly opposed to the main field. Thus, the application of a generator overload causes an increase in field current which tries to maintain the flux. This increase of field current can be anywhere up to 400% of normal excitation, depending on the type of the machine and kind of overload.

In order to insure good protection of a machine, it is necessary to open the field circuit contactor as quickly as possible, and, at the same time, insure a maximum rate of flux decay. This latter feature is not always possible with the standard industrial contactor which usually has a maximum arc voltage not exceeding 600 volts. Therefore, a field contactor must be provided which has a high speed of operation, and which has a high arc voltage so as to insure an instantaneous forcing of the generator flux decay.

The problem of protecting the machines of a variable voltage drive becomes more difficult when a plurality of generators are connected to a common bus to supply power to the main motor, which is connected directly to the bus, because of the fact that all of the generators and the motor will feed a fault on the bus or in one of the machines. Thus, the cost of supplying individual circuit breakers for each machine of sufficient capacity to interrupt such a fault current becomes excessive. Furthermore, a breaker may not be able to protect the commutator and brush arms of a machine against damage in case of a flashover, since the fault is inside the machine.

An object of my invention, generally stated, is to provide an overload protective system for the dynamoelectric machines of a variable voltage drive, which shall be simple and efficient in operation, and which may be economically manufactured and installed.

A more specific object of my invention is to provide overload and short circuit protection for a plurality of dynamoelectric machines which are connected to a common bus.

Another object of my invention is to provide for opening the field circuits of the main machines of a variable voltage drive quickly and simultaneously.

A further object of my invention is to secure high arc voltages during the interrupting of the field circuits of the machines to obtain a maximum rate of flux decay in the machines.

Other objects of my invention will be explained fully hereinafter, or will be apparent to those skilled in the art.

In accordance with one embodiment of my invention, the main field circuits for the generators and the motor of a variable voltage propulsion drive are opened simultaneously by a four-pole electromagnetic high-speed contactor. A high-speed overload relay, which is responsive to the current in the commutating field of the propulsion motor, controls the opening of the field circuit contactor. A field discharge resistor, having a relatively high resistance, is connected across the main field winding of each machine to secure an induced voltage approaching the actual test voltage of the field winding. The field circuit contactor has a high arc voltage, thereby securing a fast rate of flux decay in the machines.

For a better understanding of the nature and objects of the invention, reference may be had to the following detailed description, taken in conjunction with the accompanying drawings, in which:

Figure 1 is a diagrammatic view of a power system embodying the principal features of the invention;

Figure 3:
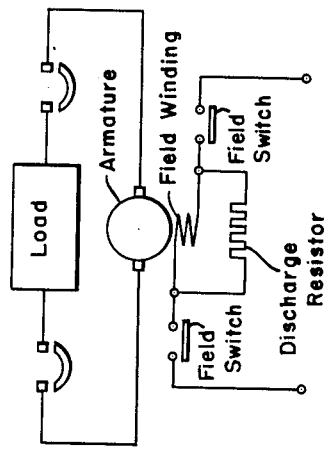
Fig. 3 is a diagrammatic view of the test connections utilized when obtaining the curves of Fig. 2.

Referring now to the drawings, and particularly to Fig. 1, the system shown therein comprises a propulsion motor 10, a plurality of main generators G1, G2 and G3, a motor exciter 11, a generator exciter 12, a control generator 13, a field switch or contactor 14, an over load relay OL and circuit breakers 15, 16 and 17 for connecting the generators G1, G2 and G3, respectively, to a bus 18 to which the motor 10 is connected directly. The motor 10 drives a propeller 19 through a shaft 20.

The motor 10 has a separately excited field winding 21 and commutating field winding 22. The generators G1, G2 and G3 have separately excited field windings 23, 24 and 25, respectively, which are energized by the generator exciter 12. The motor field winding 21 is energized by the motor exciter 11. The generators may be driven by suitable prime movers, such as diesel engines (not shown). The exciters 11 and 12 and the control generator 13 may be driven by electric motors energized from any suitable source of auxiliary power.

The motor exciter 11 has a field winding 26, and the generator exciter 12 has a field winding 27 which are energized by the control generator 13. Variable rheostats 28 and 29 are provided for adjusting the excitation of the exciters 11 and 12, respectively. The generator 13 has a series field winding 31 and a shunt field winding 32. A variable rheostat 33 is provided for adjusting the excitation of the generator 13. Disconnect switches 34, 35 and 36 are provided in the circuits for the generator field windings 23, 24 and 25, respectively, which are connected across the generator exciter 12.

The circuit breakers 15, 16 and 17 each have sufficient interrupting capacity to perform the necessary switching operations and to protect the system against normal overload, but they do not have the capacity to interrupt the current resulting from commutator flashovers or other faults. In case of a commutator flashover or another fault current exceeding about 250% normal current, a high speed relay OL trips the fast operating field switch 14, thereby opening both the generator and the motor field circuits simultaneously.

As shown, the actuating coil of the relay OL is connected across the commutating field winding 22 of the motor 10, and the relay is responsive to the current in the commutating field winding. Thus, this relay is actuated by a flashover in any one of the generators, since the motor will feed current into such a flashover, or by a flashover in the motor, since the generators will feed current into a flashover in the motor. When the contact members of the relay OL are opened, the actuating coils of the field switch 14 are deenergized.

The switch 14 is a high speed contactor of the electromagnetic type having actuating coils 37 and 38 which close the contact members of the switch against the force of a spring 39 when the coils are energized. When the coils 37 and 38 are deenergized, the spring 39 opens the contact members quickly, thereby interrupting the circuits for the motor and the generator field windings.

As explained hereinbefore, in order to insure good protection of a machine, it is necessary to open the field contactor as quickly as possible, and, at the same time, secure a maximum rate of flux decay. The latter is secured by a high arc voltage which is obtained by utilizing field discharge resistors having a high resistance. The maximum induced voltage is equal to the product of field current times the value of the discharge resistance.

Therefore, the field discharge resistor should be at least about ten times the resistance of the field winding, or the induced voltage should approach the maximum voltage for which the field winding is tested. Accordingly, such a resistor 41 is connected in parallel-circuit relation with the motor field winding 21. Likewise, discharge resistors 43, 44 and 45 are connected in parallel-circuit relation with the generator field windings 23, 24 and 25, respectively.

Figure 2:
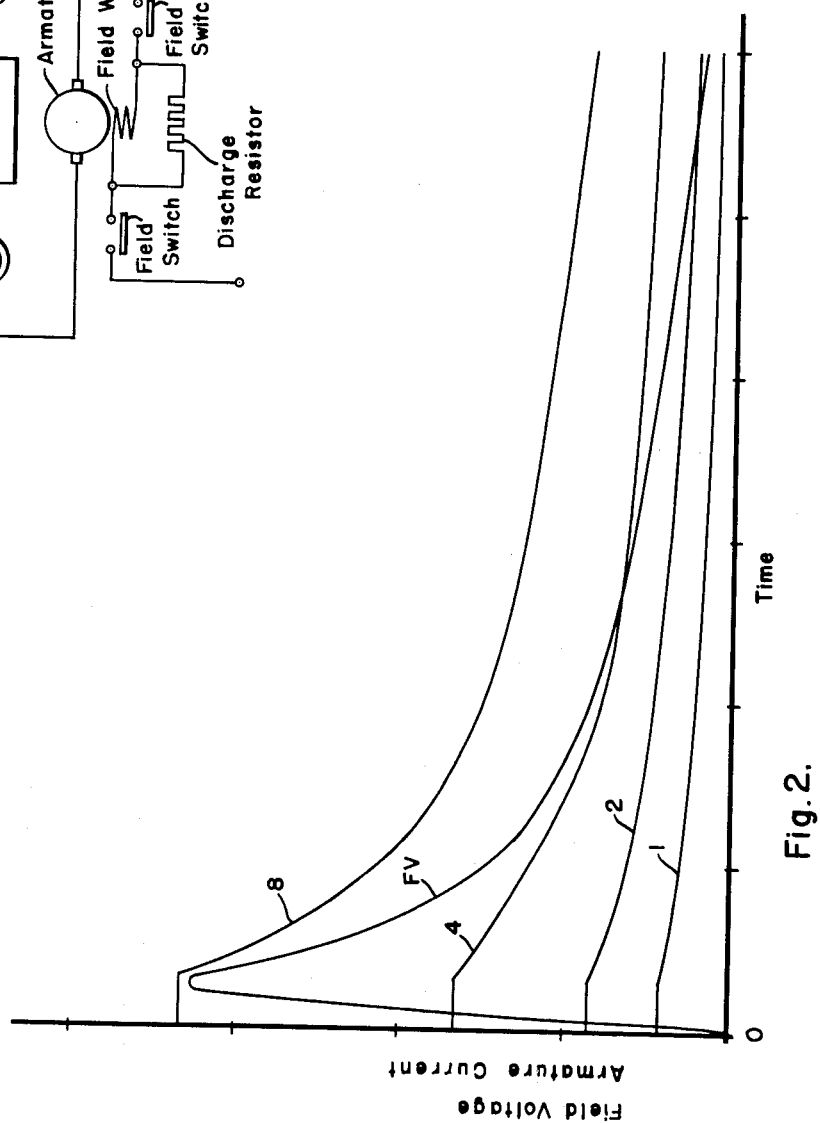
Fig. 2 is a set of curves illustrating the performance of a test generator under overload conditions and a forced flux decay.

The curves in Fig. 2 illustrate the performance of a typical generator subjected to various overloads and a forced flux decay by means of a discharge resistor. The test connections for the generator are shown in Fig. 3. The curves 1, 2, 4 and 8 show the armature current for 100%, 200%, 400% and 800% load, respectively. The field switch was opened at "zero" time and the curve FV shows the field or arc voltage attained before the interruption of the arc. It will be noted from the curves that the armature fault current begins to drop only after the maximum arc voltage has been established. Therefore, it is important that a field switch with a high arc voltage be utilized to insure an instantaneous forcing of the generator flux decay.

In the foregoing manner, a fault of very high magnitude may be cleared. Also, the commutator and brush arms of the machine are protected against excessive damage in case of a flashover which a circuit breaker may not be able to accomplish, since the fault is inside the machine. Therefore, the machines in a power system are protected against damage in spite of the large concentration of power. At the same time, the cost of the protective equipment is kept within reasonable limits.

Since numerous changes may be made in the above-described construction, and different embodiments of the invention may be made without departing from the spirit and scope thereof, it is intended that all matter contained in the foregoing description or shown in the accompanying drawing shall be interpreted as illustrative and not in a limiting sense.

I claim as my invention:

1. In a power system, in combination, a motor having an armature winding and a main field winding, a discharge resistor connected in parallel-circuit relation with the main field winding, said armature winding being connected to a power bus, a plurality of generators connected to said bus, each generator having a main field winding, a discharge resistor connected in parallel-circuit relation with each generator field winding, excitation means for energizing the main field windings of said motor and said generators, circuit interrupting means for opening the motor and the generator main field winding circuits simultaneously, and relay means responsive to the current in the armature winding of the motor for controlling the operation of the circuit interrupting means.

2. In a power system, in combination, a motor having an armature winding and a main field winding, a discharge resistor connected in parallel-circuit relation with the main field winding, said armature winding being connected to a power bus, a plurality of generators connected to said bus, each generator having a main field winding, a discharge resistor connected in parallel-circuit relation with each generator field winding, excitation means for energizing the main field windings of said motor and said generators separately, circuit interrupting means for opening the motor and the generator main field winding circuits simultaneously, and relay means responsive to an overload current in the armature winding of the motor for controlling the operation of the circuit interrupting means.

3. In a power system, in combination, a motor having an armature winding and a main field winding, a discharge resistor connected in parallel-circuit relation with the main field winding, said armature winding being connected to a power bus, a plurality of generators connected to said bus, each generator having a main field winding, a discharge resistor connected in parallel-circuit relation with each generator field winding, separate excitation means for energizing the main field windings of said motor and said generators, circuit interrupting means for opening the motor and the generator main field winding circuits, and relay means responsive to the current in the motor armature winding for controlling the operation of the circuit interrupting means.

4. In a power system, in combination, a motor having an armature winding, a main field winding and a commutating field winding, a discharge resistor connected in parallel-circuit relation with the main field winding, said armature winding being connected to a power bus, a plurality of generators connected to said bus, each generator having a main field winding, a discharge resistor connected in parallel-circuit relation with each generator field winding, excitation means for energizing the main field windings of said motor and said generators, circuit interrupting means for opening the motor and the generator main field winding circuits simultaneously, and relay means responsive to the current in the motor commutating field winding for controlling the operation of said circuit interrupting means.

5. In a power system, in combination, a motor having an armature winding, a main field winding and a commutating field winding, a discharge resistor connected in parallel-circuit relation with the main field winding, said armature winding being connected to a power bus, a plurality of generators connected to said bus, each generator having a main field winding, a discharge resistor connected in parallel-circuit relation with each generator field winding, excitation means for energizing the main field windings of said motor and said generators, circuit interrupting means for opening the motor and the generator main field winding circuits simultaneously, and relay means responsive to the current in the motor commutating field winding for controlling the operation of said circuit interrupting means, the resistance of each field discharge resistor being approximately ten times the normal resistance of the field winding across which it is connected.

6. In a power system, in combination, a motor having an armature winding, a main field winding and a commutating field winding, a discharge resistor connected in parallel-circuit relation with the main field winding, said armature winding being connected to a power bus, a plurality of generators connected to said bus, each generator having a main field winding, a discharge resistor connected in parallel-circuit relation with each generator field winding, excitation means for energizing the main field windings of said motor and said generators, circuit interrupting means for opening the motor and the generator main field winding circuits simultaneously, and a high speed relay having an actuating coil connected across the motor commutating field winding, said relay having contact members for controlling the opening of said circuit interrupting means.

7. In a power system, in combination, a motor having an armature winding and a main field winding, a discharge resistor connected in parallel-circuit relation with the main field winding, said armature winding being connected to a power bus, a plurality of generators connected to said bus, each generator having a main field winding, a discharge resistor connected in parallel-circuit relation with each generator field winding, excitation means for energizing the main field windings of said motor and said generators, circuit interrupting means for opening the motor and the generator main field winding circuits simultaneously, and a high speed relay having an actuating coil responsive to the current in the armature winding of the motor, said relay having contact members for controlling the operation of said circuit interrupting means, and said circuit interrupting means being opened when the relay contact members are actuated.

8. In a power system, in combination, a motor having an armature winding, a main field winding and a commutating field winding, a discharge resistor connected in parallel-circuit relation with the main field winding, said armature winding being connected to a power bus, a plurality of generators connected to said bus, each generator having a main field winding, a discharge resistor connected in parallel-circuit relation with each generator field winding, excitation means for energizing the main field windings of said motor and said generators, an electromagnetic contactor for interrupting the motor and the generator main field winding circuits simultaneously, said contactor having an actuating coil for closing the contactor and spring means for opening the contactor, and relay means responsive to an overload in the motor commutating field winding for controlling the energization of the actuating coil of the contactor.

9. In a power system, in combination, a motor having an armature winding, a main field winding and a commutating field winding, a discharge resistor connected in parallel-circuit relation with the main field winding, said armature winding being connected to a power bus, a plurality of generators connected to said bus, each generator having a main field winding, a discharge resistor connected in parallel-circuit relation with each generator field winding, excitation means for energizing the main field windings of said motor and said generators, an electromagnetic contactor for interrupting the motor and the generator main field winding circuits simultaneously, said contactor having a plurality of actuating coils for closing the contactor and spring means for opening the contactor, and relay means responsive to an overload in the motor commutating field winding for controlling the energization of said actuating coils on the contactor.

10. In a power system, in combination, a propulsion motor having an armature winding, a main field winding and a commutating field winding, a discharge resistor connected in parallel-circuit relation with the main field winding, said armature winding being connected to a power bus, a plurality of generators connected to a power bus, a plurality of generators connected to said bus, each generator having a main field winding, a discharge resistor connected in parallel-circuit relation with each generator field winding, an exciter for energizing the motor main field winding, another exciter for energizing the main field windings of the generators, a multi-pole contactor for interrupting the motor and the generator main field winding circuits simultaneously, and relay means responsive to the current in the motor commutating field winding for controlling the operation of said contactor.

References Cited in the file of this patent

UNITED STATES PATENTS

| | | |
|---|---|---|
| 1,392,137 | Fortescue | Sept. 27, 1921 |
| 1,704,331 | Lauthrup et al. | Mar. 5, 1929 |
| 1,861,454 | Schaelchlin | June 7, 1932 |
| 1,899,550 | Beekman | Feb. 28, 1933 |
| 2,100,839 | Ellis | Nov. 30, 1937 |